Patented Sept. 3, 1946

2,406,755

UNITED STATES PATENT OFFICE 2,406,755

MODIFIED CELLULOSE ESTER FIBERS

Robert E. Fothergill, Julian W. Hill, and Alfred A. Johnson, Wilmington, Del., assignors to E. I. du Pont de Nemours & Company, Wilmington, Del., a corporation of Delaware No Drawing. Application October 6, 1943, Serial No. 505,216

17 Claims. (Cl. 18—47.5)

The invention relates to modified cellulose organic acid ester fibers. More particularly this invention relates to a process for producing modified cellulose acetate fibers which are substantially insoluble in organic solvents, and to the novel products of this process.

Cellulose acetate fibers have a number of properties which make them eminently suitable for use in fabricating various types of fabrics or textiles, and they have found wide application in this field. However, they suffer from the disadvantage of being soluble in or seriously softened by a number of common organic solvents. For this reason, fabrics containing cellulose acetate fibers are subject to damage from these solvents. Processes have been described for making cellulose derivatives insoluble in organic solvents by modification with bifunctional reagents such as hexamethylene diisocyanate, s-(bis-methoxymethyl)-urea, etc. However, fibers modified with these reagents are generally too brittle to be used in all applications.

An object of this invention, therefore, is to provide modified cellulose organic acid ester fibers which are non-brittle and substantially insoluble in organic solvents. A further object is to produce modified cellulose acetate fibers substantially insoluble in organic solvents and having the desirable characteristics of unmodified cellulose acetate fibers. The above and other objects will more clearly appear hereinafter.

These objects are realized by our invention which, stated in general terms, comprises incorporating in a spinning solution of an organic acid ester of cellulose a small amount of mineral acid and a polysilicic acid partially esterified with a monohydric alcohol of from 1 to 6 carbon atoms, spinning the resulting solution by the conventional dry or evaporative technique, and thereafter subjecting the fibers thus formed to heat treatment whereby to impart the desired insolubility. Preferably the polysilicic acid ester is one having a relatively low degree of esterification and low molecular weight.

By the term "relatively low degree of esterification," we mean to define esters wherein the ratio of ester groups to silicon atoms is less than 0.6 to 1.0.

By esters of "low molecular weight" is meant those contained in a solution of polysilicic ester which has been aged at 25° C. less than three-quarters of the time required to produce gelation of the solution.

For purposes of convenience the invention will be further described with particular reference to cellulose acetate. It will be understood, however, that the invention is not so limited but applies as well to the production of organic solvent-insoluble fibers from any other filament-forming organic acid ester of cellulose.

The cellulose acetate used for the preparation of modified yarn of this invention may be any of the commercially available grades which are suitable for dry-spinning into yarn. A cellulose acetate containing 54.5% combined acetic acid is especially suitable.

The partially esterified polysilicic acids useful for purposes of this invention may be prepared by processes such as those described in Kirk, Serial No. 439,549 filed April 18, 1942, now Patent No. 2,395,880, and in Iler and Kirk, Serial No. 439,548 filed April 18, 1942. Detailed descriptions of procedures for preparing preferred types of polysilicic acid esters are given below. Throughout the specification and claims parts and percentages are by weight unless otherwise indicated.

*Procedure A.*—An aqueous solution of relatively low molecular weight polysilicic acid is prepared by adding 900 parts of a 15.5% solution of sodium silicate ($SiO_2:Na_2O=3.25:1$ by weight) to 860 parts of a vigorously stirred solution of 7.3% sulfuric acid over a period of 4–10 minutes. To the resulting solution (pH 1.7–1.8) 300 parts of tert.-butyl alcohol is added and the mixture stirred for about 10 minutes. At the end of this time 450 parts of sodium chloride is added, and stirring continued for about 5 minutes or until the salt is substantially all dissolved. The upper, tert.-butyl alcohol layer which separates when the mixture is allowed to stand for 45 minutes at room temperature, is separated from the aqueous lower layer and centrifuged for 15 minutes. A small layer of water forms on the bottom of the centrifuge bottle, and a clear tert.-butyl alcohol layer forms on top with an intermediate layer of gel particles. The clear, tert.-butyl alcohol layer, amounting to about 284 parts, is removed and immediately cooled to a temperature of 0°–5° C. to decrease the rate of polymerization of the polysilicic acid ester.

For use in the modification of a cellulose acetate spinning solution, it is preferable to have the polysilicic acid ester in solution in acetone. Such an acetone solution is prepared from the above tert.-butyl alcohol solution as follows: One volume of freshly prepared, cold (0°–5° C.) tert.-butyl alcohol solution is rapidly and thoroughly mixed with 0.5 volume of acetone and 1.5 volumes of a high flash naphtha having a boiling range of 150°–200° C. The concentrated acetone solution of butyl acid polysilicate which separates as the lower layer contains about 34% of $SiO_2$ and is drawn off after exactly 10 minutes and immediately diluted with more acetone to form a solution of 5–20% $SiO_2$ as butyl acid polysilicate. The dilute acetone solution is filtered to remove a small amount of salt which is present. This contains a small amount of free sulfuric acid. A 20% solution contains about 0.45–0.60% sulfuric acid, while a 5% solution contains about 0.11–0.15% sulfuric acid. This amount of sulfuric acid has a deleterious effect on the yarn properties of cellulose acetate containing it as a modifier. However, if the sulfuric acid is completely removed, the stability of the butyl acid polysilicate solution is too poor for the solution to be used in the preparation of cellulose acetate yarn. It has been found that the minimum free acidity of an acetone solution (5% $SiO_2$) of this type of modifier, which is considered to be stable enough to be used in making a cellulose acetate spinning solution, is about 0.015–0.02% sulfuric acid. An acetone solution of the desired free acidity is obtained as follows: One hundred parts of an acetone solution containing 4.7% $SiO_2$ and 0.147% sulfuric acid is stirred with 1 part of barium carbonate until the free acidity is reduced to 0.0175–0.02%. This requires from ½ to 2½ hours. The solution is then filtered. If the free sulfuric acid content of the solution should be reduced to below 0.015% by this treatment, the calculated quantity of sulfuric acid is added to the filtered solution to bring the free acidity back to 0.015–0.02%. For best results, the acetone solution should be kept cold and used as soon as possible after its preparation, as the polysilicic acid ester gradually polymerizes on standing.

*Procedure B.*—Another process for the preparation of a butyl acid polysilicate which is effective in reducing the tetrachloroethane solubility of cellulose acetate is as follows: To 1,760 parts of an aqueous solution of relatively low molecular weight polysilicic acid prepared as described above in procedure A are added 196 parts of tributyl phosphate and 460 parts of sodium chloride. The mixture is stirred for one hour and then is allowed to stand for one hour, at room temperature. The upper, tributyl phosphate layer is separated and dried over anhydrous sodium sulfate. The yield of clear tributyl phosphate solution of butyl acid polysilicate is 125 parts. To obtain a solution of butyl acid polysilicate suitable for addition to a cellulose acetate spinning solution, one volume of this tributyl phosphate solution is thoroughly mixed with one volume of methanol and 2.5 volumes of benzene during one or two minutes and then allowed to stand at room temperature for 12–14 minutes. At the end of this time the mixture is separated into two layers, the lower of which is a concentrated solution of butyl acid polysilicate containing about 54% $SiO_2$. This lower layer is immediately diluted with sufficient acetone to make a solution containing 20% $SiO_2$. The resulting solution contains about 0.06% sulfuric acid and can be used directly in the preparation of a cellulose acetate spinning solution.

The preparation of a partially esterified alkyl polysilicate of low molecular weight and relatively high degree of esterification by the partial hydrolysis of a tetra-alkyl silicate is illustrated by the following example.

*Procedure C.*—One hundred four parts of tetraethyl silicate is added to a solution of 3 parts of 0.01 N hydrochloric acid, 6 parts of water, and 120 parts of absolute ethyl alcohol previously cooled to 8° C. This solution contains 1 mole of water for each mole of ethyl silicate. After thorough mixing the solution is maintained at 0°–5° C. until ready to be used in the preparation of a cellulose acetate spinning solution.

The preferred procedure for the preparation of a polysilicic acid ester-modified cellulose acetate yarn is as follows: A spinning solution is prepared by mixing cellulose acetate with a sufficient quantity of an acetone solution of a partially esterified polysilicic acid of relatively low degree of esterification and low molecular weight (prepared as described above) to form a solution of 24–27% total solids concentration, with the proportion of polysilicic acid ester to cellulose acetate within the range of 12–16 parts (calculated as $SiO_2$) to 100 parts (by weight) of cellulose acetate. In spinning solutions of the above specified compositions, these proportions correspond to concentrations of 21.4 to 23.25% cellulose acetate and 2.57 to 3.72% $SiO_2$. It is also desirable that the spinning solution contain a small amount of free acid, 0.01 to 0.015% calculated as sulfuric acid, in order to obtain satisfactory filterability and spinnability of the solution. The solution is then filtered and spun in regular cellulose acetate dry spinning equipment under ordinary spinning conditions. The resulting yarn is heated for 1 to 2 hours at a temperature of 160°–170° C. After this heat treatment, the modified cellulose acetate yarn is substantially unaffected by immersion in hot (60° C.) tetrachloroethane for 15 minutes and has a sticking point 15°–20° C. higher than that of unmodified cellulose acetate, as determined by a test which is described later.

The following examples further illustrate the practice of this invention.

*Example I*

This example illustrates the preparation of a polysilicic acid ester-modified cellulose acetate yarn by use of a butyl acid polysilicate of low degree of esterification and relatively low molecular weight prepared by the tributyl phosphate extraction process as described in Procedure B above.

To 1,942 parts of a filtered acetone solution containing 510 parts of cellulose acetate containing 54.5% combined acetic acid is added 337 parts of an acetone-methanol (4–1) solution of a low molecular weight, lowly esterified butyl acid polysilicate (prepared by the tributyl phosphate extraction procedure) containing 21.6% $SiO_2$. The solution, which contains 14.3 parts $SiO_2$ per 100 parts of cellulose acetate, is thoroughly mixed by tumbling overnight and is ready for spinning in a standard cellulose acetate dry spinning cell. Yarn of 100 denier is obtained by extruding the solution through a spinneret having 16 holes of 0.08 mm. diameter, at a head temperature of 58° C., cell temperature of 95° C., pressure of 250 lbs. per sq. in., and a wind-up speed of 200 yds./min. When tested immediately after spinning, the yarn is swollen considerably by tetrachloroethane and is completely soluble in acetone. The yarn is then heated for 1.5 hours at 160° C. After this treatment the yarn is insoluble in acetone, and after immersion in tetrachloroethane at 60° C. the individual filaments do not stick together. The yarn before baking has dry, wet, and loop tenacities of 1.17, 0.65, and 1.03 g./d. and corresponding elongations of 22, 32, and 18%, respectively. After being heated for 90 minutes at 165° C., the yarn has dry, wet, and loop tenacities of 1.20, 0.75, and 1.0 g./d. and dry, wet, and loop elongations of 21, 32, and 15%, respectively. The heated yarn has a swelling factor, determined as described later, of 1.5. After immersion in tetrachloroethane at 60° C. for 15 minutes, the heated yarn has dry, wet, and loop tenacities of 1.00, 0.68, and 0.87 g./d. with corresponding elongations of 34, 44, and 32%. Yarn of substantially the same physical properties is obtained by heating at 150° C. for 3–17 hours or for a few seconds at 255° C.

The swelling factor of cellulose acetate yarn in tetrachloroethane at 60° C. is determined as follows. A tuft or small skein of fibers is weighed, immersed in tetrachloroethane at 60° C.±1° C. for 15 minutes, and centrifuged for 2 minutes in a 5" basket at approximately 3,000 R. P. M. and weighed again. The weight of tetrachloroethane absorbed per gram of yarn is designated as the swelling factor.

*Example II*

This example illustrates the preparation of tetrachloroethane-resistant cellulose acetate yarn by the use of a butyl acid polysilicate of low degree of esterification and low molecular weight prepared by the tert.-butyl alcohol process.

A spinning solution is prepared by placing 2,486 parts of cellulose acetate of 54.5% combined acetic acid, 7,565 parts of an acetone solution of butyl acid polysilicate prepared by the tert.-butyl alcohol process (procedure A) containing 5.25% $SiO_2$ and 0.02% sulfuric acid, and 1,000 parts of acetone in an enclosed paddle-type mixer, and stirring eight hours at a temperature of about 35° C. After mixing, the solution contains 27.3% solids and is filtered through a cellulose acetate filter pack. Yarn of 75 denier was spun through a spinneret containing 24 holes of 0.05 mm. diameter under the following conditions: head temperature 60° C., cell temperature 90° C., pressures of 270–595 lbs. per sq. in., and wind-up speeds of 210–608 yds./min. This yarn is soluble in acetone and hot tetrachloroethane immediately after being spun. However, by heating it for 90 minutes at 168° C., yarn is obtained which is highly resistant to tetrachloroethane at 60° C. It has a swelling factor of 1.0. The physical properties of the yarn before heating are: dry, wet, and loop tenacities of 0.98, 0.65, and 0.92 g./d. with corresponding elongations of 15.5, 25.2, and 14.3%. Yarn heated for 90 minutes at 168° C. and immersed in tetrachloroethane at 60° C. for 15 minutes has the following physical properties: dry, wet, and loop tenacities of 0.86, 0.66, and 0.78 g./d. and corresponding elongations of 23.8, 33.5, and 22.5%, respectively.

*Example III*

This example illustrates the preparation of a polysilicic acid ester-modified cellulose acetate yarn by the use of a partially esterified ethyl polysilicate of relatively low molecular weight and high degree of esterification.

A solution for spinning into fibers by the electrostatic procedure is prepared by adding to 71.6 parts of a filtered acetone solution containing 14.25 parts of cellulose acetate of 54.5% combined acetic acid, 17.4 parts of an ethyl alcohol solution of ethyl acid polysilicate containing 12.9% $SiO_2$. This modifier is one of relatively low molecular weight and high degree of esterification prepared as described in procedure C by the partial hydrolysis of tetraethyl silicate. The resulting solution contains 16% cellulose acetate and 2.24% $SiO_2$ as ethyl acid polysilicate. This solution is extruded in a fine stream into an electrostatic field to form fibers by a process similar to that described in U. S. Patent No. 1,975,504 to Formhals. The fibers are then heated 16 hours at 150° C. After this heat treatment the individual filaments are not stuck together after immersion in tetrachloroethane at 60° C. for 15 minutes. With this highly esterified type of modifier, the long baking treatment is necessary to obtain satisfactory resistance to tetrachloroethane. If these fibers are baked for only 90 minutes at 150° C., they are highly swollen by tetrachloroethane at 60° C.

*Example IV*

This example illustrates the modification of cellulose acetate yarn with 8% of its weight of $SiO_2$ in the form of a low molecular weight, lowly esterified butyl acid polysilicate.

A spinning solution containing 22.5% cellulose acetate and 2.0% $SiO_2$ as butyl acid polysilicate is made as follows: One thousand one hundred twenty-five (1,125) parts of cellulose acetate of 54.5% combined acetic acid is dissolved in 3,450 parts of acetone and 460 parts of a solution of a low molecular weight, low degree of esterification butyl acid polysilicate in acetone-methanol (4:1) containing 21.8% $SiO_2$. The solution is filtered through a regular cellulose acetate filter pack and spun into yarn of about 100 denier, having 40 filaments, under the following conditions: Head temperature 60°–61.5° C., cell temperature 90° C., pressure 175–185 lbs./sq. in., and wind-up speed 300 yds./min. The resulting yarn has the following physical properties: Dry, wet, and loop tenacities of 1.28, 0.91, and 1.50 g./d. and corresponding elongations of 25, 28, and 23%. After this yarn is heated for 90 minutes at 150° C., it has the following physical properties: Dry, wet, and loop tenacities of 1.20, 0.81, and 1.19 g./d. with corresponding elongation of 20, 18, and 19%. The modified yarn has a sticking point about 10°–20° C. higher than that of unmodified cellulose acetate.

The sticking point of cellulose ester yarn is determined as follows: Both ends of a six-inch length of the yarn are tied to a weight of 0.7–0.8 g. The weighted end of the yarn is passed over a horizontal brass rod held in front of a Maquenne block and a few millimeters above its top surface, and the looped end passed around another rod held similarly on the other side of the block. The double strand of yarn is held against the surface of the block by a 200 g. brass weight 3 cm. in diameter. The block is heated at a rate of 5° C. per minute. As the temperature of the block rises, the weight is lifted from the yarn every 5° C. At low temperatures the yarn comes immediately off the surface of the block, but at the sticking temperature adheres to the block. According to this test unmodified cellulose acetate yarn sticks at 165° C.

It will be understood, of course, that the above examples are merely by way of illustration and that the invention is not limited to the exact agents and conditions set forth therein but is susceptible rather to a wide substitution of materials and variation in the essential conditions. Thus, in addition to the ethyl and tert.-butyl acid polysilicates which are specifically described in the examples as modifiers for cellulose acetate, partially esterified silicic acid esters of other alcohols may also be used. As examples of esters of other alcohols may be mentioned partially esterified esters of polysilicic acids of diacetone alcohol, normal and isopropanol, n-butanol, and tert.-amyl alcohol.

The preferred types of polysilicic acid esters for use as modifiers in cellulose acetate yarn are those of relatively low molecular weight and low degree of esterification. However, other types of polysilicic acid esters will also produce some degree of solvent resistance and also heat resistance. As indicated in Example III, an ethyl acid polysilicate of low molecular weight and high degree of esterification requires a much longer heating treatment (16 hours at 160° C.) to obtain an acetate yarn insoluble in tetrachloroethane than a butyl acid polysilicate of low degree of esterification and low molecular weight, which requires only 90 minutes at 160° C. Likewise, polysilicic acid esters of relatively high molecular weight are not as effective as those of low molecular weight.

The preferred amount of partially esterified polysilicic acid ester to be used in modifying cellulose acetate is from 12 to 16 parts (calculated as $SiO_2$) of modifier for 100 parts of cellulose acetate. On the basis of the amount of $SiO_2$ in the yarn, this corresponds to from 10.7 to 13.8%. However, amounts of polysilicic acid esters ranging from 5 parts (calculated as $SiO_2$) per 100 parts of cellulose acetate to as much as 20 parts or more per 100 parts of cellulose acetate may be used. Cellulose acetate yarn modified with amounts of polysilicic acid esters amounting to 5 to 10 parts per 100 are less resistant to solvents than yarns modified with the preferred proportions. Cellulose acetate yarns modified with 20 or more parts of partially esterified polysilicic acid (calculated as $SiO_2$) are resistant to solvents, after heat treatment, but may have inferior physical properties due to incompatibility of the modifier with the cellulose acetate. The compatibility of the modifier will depend on the particular ester being used, an ethyl ester, for example, being more compatible than a butyl or amyl ester, and esters of lowest molecular weight are more compatible than those of higher molecular weight.

The minimum amount of free mineral acid, e. g. sulfuric acid or hydrochloric acid, which has been found necessary to maintain satisfactory stability is about 0.01 to 0.015% in a spinning solution containing approximately 25% cellulose acetate. The amount of free sulfuric acid carried along with a modifier prepared by the tributyl phosphate extraction of an aqueous silicic acid solution is just sufficient to form this concentration of free acid in a spinning solution containing 10–16 parts of $SiO_2$ per 100 parts of cellulose acetate. However, when an aqueous polysilicic acid solution is extracted by tert.-butyl alcohol, a larger amount of sulfuric acid is carried along with the butyl acid polysilicate. With this type of modifier the acidity must be reduced so that the cellulose acetate spinning solution to which it is added will not contain more than 0.015% sulfuric acid. As described in Procedure A above, treatment with solid barium carbonate is satisfactory. In this treatment care must be taken that the acetone solution of butyl acid polysilicate is allowed to stand in the presence of the barium carbonate no longer than is necessary to reduce the free acid to the desired limits since polysilicic acid esters polymerize quite rapidly at a pH greater than 3.0. If an acetone solution is allowed to stand in the presence of excess barium carbonate for even 1 to 2 hours at a temperature of 0°–5° C., the molecular weight of the polysilicic acid ester will increase sufficiently to make it inferior as a modifier for cellulose acetate. The presence of more than 0.015% sulfuric acid in the cellulose acetate spinning solution will improve the filterability and spinnability of the solution but will have a deleterious effect on the physical properties of the yarn obtained from such solutions.

The preferred heat treatment for rendering silicic acid ester-modified cellulose acetate yarn insoluble in tetrachloroethane is about 90 minutes at 160°–170° C. However, temperatures and times varying from these may be used. For example, the yarn prepared as described in Example I is somewhat resistant to tetrachloroethane at 60° C. even without being heated. When heated 15 minutes at 120° C. it has a swelling factor of 7.2, and when heated for 90 minutes at 120°, it has a swelling factor of 3.1. When heated for 90 minutes at 150° C. it has a swelling factor of 2.2, and after 13 hours at 155° C. it has a swelling factor of 0.8, which is considered to be good resistance to tetrachloroethane at 60° C. When heated 90 minutes at 165° C., this yarn has a swelling factor of 1.5, and this is also considered satisfactory resistance. The same yarn heated for a few seconds at 255° C. has a swelling factor of 0.97.

Cellulose acetate yarn modified with polysilicic acid esters may be prepared in the form of continuous filament yarn, or it may be made into staple fibers by customary procedures, depending on the particular use for which the yarn is desired.

Likewise, polysilicic acid ester-modified cellulose acetate yarn may contain other modifiers in addition to the partially esterified polysilicic acid. For example, a delusterant may also be incorporated in the yarn.

Cellulose organic acid ester yarns such as cellulose acetate yarns modified with partially esterified polysilicic acids are particularly useful in the manufacture of fabrics which are to be subjected to comparatively drastic heating treatments or exposed to organic solvents.

We claim:

1. A process which comprises spinning fibers from an organic solvent solution comprising essentially an organic acid ester of cellulose, from 5 to 20 parts by weight of a low molecular weight partial ester of a polysilicic acid and a monohydric aliphatic alcohol having from one to six carbon atoms, per 100 parts of the cellulose ester, and from 0.01 to 0.015% by weight of a mineral acid, and heat treating the fibers for a period of time sufficient to render the same substantially insoluble in tetrachloroethane.

2. A process which comprises spinning fibers from an organic solvent solution comprising essentially an organic acid ester of cellulose, from 12 to 16 parts by weight of a low molecular weight partial ester of a polysilicic acid and a monohydric aliphatic alcohol having from one to six carbon atoms, per 100 parts of the cellulose ester, and from 0.01 to 0.015% by weight of a mineral acid, and heat treating the fibers for a period of time sufficient to render the same substantially insoluble in tetrachloroethane.

3. A process which comprises spinning fibers from an organic solvent solution comprising essentially an organic acid ester of cellulose, from 12 to 16 parts by weight of a low molecular weight partial ester of a polysilicic acid and a monohydric aliphatic alcohol having from one to six carbon atoms, per 100 parts of the cellulose ester, and from 0.01 to 0.015% by weight of a mineral acid, the ratio of ester groups to silicon atoms in said partial ester being less than 0.6 to 1.0, and heat treating the fibers for a period of time sufficient to render the same substantially insoluble in tetrachloroethane.

4. A process which comprises spinning fibers from an organic solvent solution comprising essentially cellulose acetate, from 12 to 16 parts by weight of a low molecular weight partial ester of a polysilicic acid and a monohydric aliphatic alcohol having from one to six carbon atoms, per 100 parts of cellulose acetate, and from 0.01 to 0.015% by weight of a mineral acid, and heat treating the fibers for a period of time sufficient to render the same substantially insoluble in tetrachloroethane.

5. A process which comprises spinning fibers from an organic solvent solution comprising essentially cellulose acetate, from 12 to 16 parts by weight of a low molecular weight partial ester of a polysilicic acid and a monohydric aliphatic alcohol having from one to six carbon atoms, per 100 parts of cellulose acetate, and from 0.01 to 0.015% by weight of a mineral acid, the ratio of ester groups to silicon atoms in said partial ester being less than 0.6 to 1.0, and heat treating the fibers for a period of time sufficient to render the same substantially insoluble in tetrachloroethane.

6. A process which comprises spinning fibers from an organic solvent solution comprising essentially cellulose acetate, from 12 to 16 parts by weight of a low molecular weight partial ester of a polysilicic acid and a monohydric aliphatic alcohol having from one to six carbon atoms, per 100 parts of cellulose acetate, and from 0.01 to 0.015% by weight of sulfuric acid, the ratio of ester groups to silicon atoms in said partial ester being less than 0.6 to 1.0, and heat treating the fibers for a period of time sufficient to render the same substantially insoluble in tetrachloroethane.

7. A process which comprises incorporating in an acetone solution of cellulose acetate from 5 to 20 parts by weight of a low molecular weight partial ester of a polysilicic acid and a monohydric aliphatic alcohol having from one to six carbon atoms, per 100 parts of cellulose acetate, and from 0.01 to 0.015% of a mineral acid, dry spinning the solution to form fibers and heat treating the fibers for a period of time sufficient to render the same substantially insoluble in tetrachloroethane.

8. A process which comprises incorporating in an acetone solution of cellulose acetate from 5 to 20 parts by weight of a low molecular weight partial ester of a polysilicic acid and a monohydric aliphatic alcohol having from one to six carbon atoms, per 100 parts of cellulose acetate, and from 0.01 to 0.015% of a mineral acid, the ratio of ester groups to silicon atoms in said partial ester being less than 0.6 to 1.0, dry spinning the solution to form fibers and heat treating the fibers for a period of time sufficient to render the same substantially insoluble in tetrachloroethane.

9. A process which comprises incorporating in an acetone solution of cellulose acetate from 12 to 16 parts by weight of a low molecular weight partial ester of a polysilicic acid and a monohydric aliphatic alcohol having from one to six carbon atoms, per 100 parts of cellulose acetate, and from 0.01 to 0.015% of a mineral acid, the ratio of ester groups to silicon atoms in said partial ester being less than 0.6 to 1.0, dry spinning the solution to form fibers and heat treating the fibers for a period of time sufficient to render the same substantially insoluble in tetrachloroethane.

10. A process which comprises incorporating in an acetone solution of cellulose acetate from 12 to 16 parts by weight of a low molecular weight partial ester of a polysilicic acid and a monohydric aliphatic alcohol having from one to six carbon atoms, per 100 parts of cellulose acetate, and about 0.015% of sulfuric acid, dry spinning the solution to form fibers and heating the fibers from one to two hours at a temperature of from 160° to 170° C., whereby to render the fibers substantially insoluble in tetrachloroethane.

11. A process which comprises incorporating in an acetone solution of cellulose acetate from 12 to 16 parts by weight of a low molecular weight partial ester of a polysilicic acid and a monohydric aliphatic alcohol having from one to six carbon atoms, per 100 parts of cellulose acetate, and about 0.015% of sulfuric acid, dry spinning the solution to form fibers and heating the fibers for about 90 minutes at a temperature of from 160° to 170° C., whereby to render the fibers substantially insoluble in tetrachloroethane.

12. A process according to claim 9 wherein the partial ester is a butyl acid polysilicate.

13. A process according to claim 10 wherein the partial ester is a butyl acid polysilicate.

14. As a new article of manufacture fibers comprised essentially of cellulose acetate and a low molecular weight partial ester of a polysilicic acid and a monohydric aliphatic alcohol having from one to six carbon atoms, said fibers having been rendered substantially insoluble in tetrachlorethane at 60° C. by subjecting them to a temperature of from 150° C. to 255° C. for a period of time varying from a few seconds at the higher temperature to as much as 17 hours at the lower temperature.

15. As a new article of manufacture fibers comprised essentially of cellulose acetate and from 10.7 to 13.8% by weight (calculated as $SiO_2$) of a low molecular weight partial ester of a polysilicic acid and a monohydric aliphatic alcohol having from one to six carbon atoms, the ratio of ester groups to silicon atoms in said partial ester being less than 0.6 to 1.0, said fibers having been rendered substantially insoluble in organic solvents by subjecting them to a temperature of 160°–170° C. for from one to two hours.

16. An article according to claim 14 wherein the partial ester is a butyl acid polysilicate.

17. An article according to claim 15 wherein the partial ester is a butyl acid polysilicate.

ROBERT E. FOTHERGILL.
JULIAN W. HILL.
ALFRED A. JOHNSON.